US008869179B2

(12) United States Patent
Madison, Jr. et al.

(10) Patent No.: US 8,869,179 B2
(45) Date of Patent: Oct. 21, 2014

(54) ROTARY HEAD DATA STORAGE AND RETRIEVAL SYSTEM AND METHOD

(75) Inventors: Carl T. Madison, Jr., Windsor, CO (US); Timothy C. Ostwald, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/127,028

(22) PCT Filed: Jun. 12, 2012

(86) PCT No.: PCT/US2012/041996
§ 371 (c)(1),
(2), (4) Date: Dec. 17, 2013

(87) PCT Pub. No.: WO2012/173958
PCT Pub. Date: Dec. 20, 2012

(65) Prior Publication Data
US 2014/0146652 A1 May 29, 2014

Related U.S. Application Data

(63) Continuation-in-part of application No. 13/163,015, filed on Jun. 17, 2011, now Pat. No. 8,225,339.

(51) Int. Cl.
*G11B 5/56* (2006.01)
(52) U.S. Cl.
USPC .......................................................... 720/658
(58) Field of Classification Search
None
See application file for complete search history.

(56) References Cited

U.S. PATENT DOCUMENTS

| 2,866,012 | A | | 12/1958 | Ginsburg et al. |
| 4,970,707 | A | | 11/1990 | Hara et al. |
| 5,331,490 | A | | 7/1994 | Richards et al. |
| 5,343,338 | A | * | 8/1994 | Murata et al. ................... 360/69 |
| 5,404,348 | A | | 4/1995 | Terao et al. |
| 5,450,228 | A | | 9/1995 | Boardman et al. |
| 5,465,243 | A | | 11/1995 | Boardman et al. |
| 5,519,554 | A | | 5/1996 | Todd et al. |

(Continued)

FOREIGN PATENT DOCUMENTS

| DE | 2022265 | 11/1971 |
| DE | 2203840 | 8/1973 |

(Continued)

OTHER PUBLICATIONS

Office Action for U.S. Appl. No. 13/670,744 dated May 21, 2013.

(Continued)

*Primary Examiner* — Mark Blouin
(74) *Attorney, Agent, or Firm* — Brooks Kushman P.C.

(57) ABSTRACT

A data storage and retrieval system includes a head carriage unit having a working surface and multiple heads disposed at the working surface. The head carriage unit is adapted for rotational motion about an axis oriented substantially normal to the working surface. The system also includes a tape drive unit for moving a tape media past the working surface of the head carriage unit, the tape media having a width approximately equal to a width of the working surface of the head carriage unit. The multiple heads are configured to record multiple data tracks on or retrieve multiple data tracks from the tape media as the head carriage unit rotates while the tape media moves past the working surface of the head carriage unit.

25 Claims, 3 Drawing Sheets

(56) References Cited

U.S. PATENT DOCUMENTS

| | | | | |
|---|---|---|---|---|
| 5,585,978 | A | 12/1996 | Rottenburg et al. | |
| 5,646,806 | A | 7/1997 | Griffith et al. | |
| 5,883,868 | A | 3/1999 | Iwanaga | |
| 5,889,744 | A | 3/1999 | Iwanaga | |
| 5,953,482 | A | 9/1999 | Suzuki et al. | |
| 6,061,199 | A * | 5/2000 | Goker et al. | 360/75 |
| 6,075,678 | A | 6/2000 | Saliba | |
| 6,075,759 | A | 6/2000 | Yanagawa et al. | |
| 6,088,183 | A | 7/2000 | Nelson | |
| 6,108,165 | A * | 8/2000 | Maruyama et al. | 360/271.5 |
| 6,141,312 | A | 10/2000 | Masters et al. | |
| 6,188,535 | B1 | 2/2001 | Lemke et al. | |
| 6,285,519 | B1 * | 9/2001 | Goker | 360/48 |
| 6,297,927 | B1 | 10/2001 | Rudi | |
| 6,304,397 | B1 | 10/2001 | Ozue et al. | |
| 6,442,126 | B1 | 8/2002 | Marchant et al. | |
| 6,614,731 | B2 | 9/2003 | Ishii | |
| 6,661,616 | B2 * | 12/2003 | Yasukochi | 360/281.8 |
| 6,856,484 | B2 | 2/2005 | Johnson et al. | |
| 6,940,682 | B2 | 9/2005 | Bui et al. | |
| 7,050,265 | B2 * | 5/2006 | Kondo et al. | 360/221 |
| 7,062,682 | B2 | 6/2006 | Ozaki | |
| 7,133,262 | B1 | 11/2006 | Nayak | |
| 7,324,297 | B2 * | 1/2008 | Evans et al. | 360/69 |
| 8,014,246 | B2 | 9/2011 | Mahnad | |
| 8,077,566 | B2 | 12/2011 | Mahnad | |
| 8,174,950 | B2 | 5/2012 | Ritter et al. | |
| 8,225,339 | B1 * | 7/2012 | Madison et al. | 720/658 |
| 2003/0043498 | A1 | 3/2003 | Johnson et al. | |
| 2007/0047395 | A1 | 3/2007 | Skeeter et al. | |
| 2007/0143659 | A1 | 6/2007 | Ball | |
| 2007/0206477 | A1 | 9/2007 | Raniuk et al. | |
| 2007/0222096 | A1 | 9/2007 | Slafer | |
| 2011/0141863 | A1 | 6/2011 | Mahnad | |
| 2013/0235708 | A1 | 9/2013 | Wilson | |

FOREIGN PATENT DOCUMENTS

| | | |
|---|---|---|
| JP | 06-290401 | 10/1994 |
| JP | 07-098828 | 4/1995 |
| WO | 9202014 | 2/1992 |
| WO | 0209099 | 1/2002 |
| WO | 2007092785 A2 | 12/2008 |

OTHER PUBLICATIONS

Final Office Action for U.S. Appl. No. 13/670,744 dated Sep. 5, 2013.
Office Action for U.S. Appl. No. 13/670,712 dated Oct. 4, 2013.
Quadruplex videotape, Wikipedia.org., Mar. 30, 2011, pp. 1-3.
Optical Disc Drive, Wikipedia.org, Mar. 30, 2011, pp. 1-4.
Helical scan, Wikipedia.org, Feb. 2, 2009, pp. 1-2.
Blu-ray disc, Wikipedia.org, Mar. 29, 2011, pp. 1-10.
International Search Report for PCT/US2012/041996 dated Oct. 25, 2012.
Office Action for U.S. Appl. No. 13/622,607 dated Sep. 12, 2013.
Office Action for U.S. Appl. No. 13/670,688 dated Oct. 23, 2013.
Notice of Allowance for U.S. Appl. No. 13/670,744 dated Sep. 18, 2013.
Notice of Allowance for U.S. Appl. No. 13/670,744 dated Jan. 16, 2014.
European Patent Office; The International Searching Authority, The International Search Report for PCT/US2013/068660 mailed Feb. 25, 2014.
European Patent Office, The International Searching Authority; The International Search Report for PCT/US2013/068489 mailed Feb. 26. 2014
Final Office Action for U.S. Appl. No. 13/070,612 dated Apr. 25, 2014.
European Patent Office, International Search Report and the Written Opinion for International Application No. PCT/US2013/068489 mailed Feb. 26, 2014.
European Patent Office, International Search Report and the Written Opinion for International Application No. PCT/US213/068660 mailed Feb. 26, 2014.
United States Patent Office, Notice of Allowance for U.S. Appl. No. 13/670,744 dated Mar. 19, 2014.
International Search Report and Written Opinion for International Application No. PCT/US2013/068646 dated Feb. 24, 2014 (13 pages total).
United States Patent and Trademark Office, Notice of Allowance and Fee(s) Due for U.S. Appl. No. 13/670,688 mailed Mar. 14, 2014.
Office Action for U.S. Appl. No. 13/622,607 dated May 17, 2014.
Notice of Allowance for U.S. Appl. No. 13/670,712 dated Aug. 1, 2014.

* cited by examiner

ROTARY HEAD DATA STORAGE AND RETRIEVAL SYSTEM AND METHOD

CROSS-REFERENCE TO RELATED APPLICATION

This application is the U.S. national phase of PCT Application No. PCT/US2012/041996 filed on 12 Jun. 2012, which claims priority to U.S. application Ser. No. 13/163,015 filed on 17 Jun. 2011, now U.S. Pat. No. 8,225,339 issued Jul. 17, 2012, the disclosures of which are incorporated in their entirety by reference herein.

TECHNICAL FIELD

The following relates to a system and method for data storage and retrieval utilizing a tape medium and a rotary head.

BACKGROUND

Typical tape data storage and retrieval methods involve recording or writing data in tracks running length-wise down the tape, as well as retrieving or reading such data tracks from the tape. A multiple stripe head is used to write and/or read many parallel tracks. Magnetic heads may have more than 96 tracks with the ability to jog along the width of a magnetic tape to write and/or read more tracks. Optical tape data storage and retrieval systems using laser heads operate in a similar fashion.

Magnetic and optical tape media are frequently used for long-term storage of large quantities of data, such as in data backup or archive operations. However, the multiple stripe head designs mentioned above become inefficient as tape length is increased for greater capacity, such as in archive operations, because of the increased time it takes to access the data stored at the end of the tape. While shorter tapes result in quicker access time than longer tapes, shorter tape lengths also result in more limited storage capacity, thereby hindering archive operations where large data quantities are involved.

A wide tape to boost capacity requires many more transducers in the head. Data throughput is also a factor of tape width and the number of heads. Limits to multiple stripe head designs include the number of read and write heads and overall tape width.

Thus, there exists a need for an improved tape media data storage system and method. Such a system and method would include a rotary head design that would put more tape surface area in contact with the heads.

SUMMARY

According to one embodiment disclosed herein, a data storage and retrieval system is provided. The system comprises a head carriage unit having a substantially planar working surface and a plurality of heads disposed at the working surface. The head carriage unit is adapted for rotational motion about an axis oriented substantially normal to the working surface.

The system also comprises a tape drive unit for moving a tape media past the working surface of the head carriage unit. The tape media has a width approximately equal to a width of the working surface of the head carriage unit. The plurality of heads perform one of recording a plurality of data tracks on and retrieving a plurality of data tracks from the tape media as the head carriage unit rotates while the tape media moves past the working surface of the head carriage unit.

In an embodiment of the system, the plurality of heads move along the width of the tape media in a direction substantially perpendicular to a length of the tape media as the head carriage unit rotates and the tape media moves laterally past the working surface of the head carriage unit in a direction substantially parallel to the length of the tape media. Each of the resultant plurality of data tracks recorded on the tape media has an arcuate shape. The tape media may be an optical tape, and the plurality of heads may be optical heads.

According to another embodiment disclosed herein, a data storage and retrieval method is provided. The method comprises rotating a head carriage unit having a substantially planar working surface about an axis oriented substantially normal to the working surface. The head carriage unit has a plurality of heads disposed at the working surface.

The method also comprises moving a tape media past the working surface of the head carriage unit. The tape media has a width approximately equal to a width of the working surface of the head carriage unit. The method further comprises performing one of recording a plurality of data tracks on and retrieving a plurality of data tracks from the tape media as the head carriage unit rotates while the tape media moves past the working surface of the head carriage unit.

In an embodiment of the method, the plurality of heads move along the width of the tape media in a direction substantially perpendicular to the length of the tape media as the head carriage unit rotates and the tape media moves laterally past the working surface of the head carriage unit in a direction substantially parallel to the length of the tape media. Each of the resultant plurality of data tracks recorded on the tape media has an arcuate shape. Here again, the tape media may be an optical tape, and the plurality of heads may be optical heads.

A detailed description of these embodiments and accompanying drawings is set forth below.

DETAILED DESCRIPTION

Figure 1:
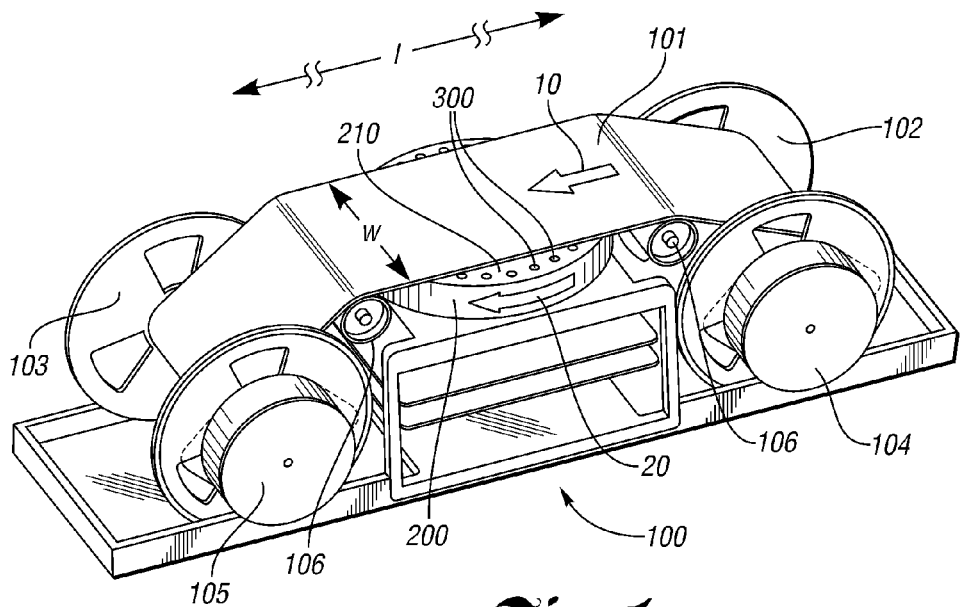
FIG. 1 is a perspective view of an embodiment of the data storage and retrieval system disclosed herein.

With reference to FIGS. 1-4, a data storage and retrieval system and method utilizing a tape media and a rotary head will be described. For ease of illustration and to facilitate understanding, like reference numerals have been used herein for similar components and features throughout the drawings.

As previously described, typical tape data storage and retrieval methods involve recording or writing data in tracks running length-wise down the tape, as well as retrieving or reading such data tracks from the tape. A multiple stripe head is used in magnetic tape storage and retrieval systems to write and/or read many parallel tracks, with the head having the ability to jog along the width of the tape to write and/or read more tracks. Optical tape storage and retrieval systems using laser heads operate in a similar fashion.

Magnetic and optical tape media are frequently used for long-term storage of large quantities of data, such as in data backup or archive operations. However, multiple stripe head designs become inefficient as tape length is increased for greater capacity because of the increased time it takes to access the data stored at the end of the tape. Shorter tape lengths result in quicker access time than longer tape lengths, but also result in more limited data storage capacity.

A wide tape to boost capacity requires many more transducers in the head. Data throughput is also a factor of tape width and the number of heads. Limits to multiple stripe head designs include the number of heads and overall tape width.

An improved tape media data storage system and method would include a rotary head design that would put more tape surface area in contact with the heads. According to an embodiment disclosed herein, a wide tape media provides a much greater tape surface area for a head, and achieves both high data capacity and fast access times. A head may be swept substantially perpendicularly across the tape width while the tape is moved longitudinally past the moving head.

More particularly, multiple heads may be assembled to a rotating head mechanism to write and/or read multiple tracks in approximate arcs on the tape. The data storage system and method disclosed herein allow for a large tape surface in proximity to many high speed heads. Such a design results in improved performance in data rates and data capacity per inch of tape. The design facilitates shorter tapes for fast searches, or longer tapes for extremely large data banks.

Referring now to FIG. 1, a perspective view of an embodiment of the data storage and retrieval system disclosed herein is shown. A tape drive system such as that shown in FIG. 1 comprises tape driving components and a head assembly. In that regard, the embodiment depicted in FIG. 1 can be described by detailing the main components in the two functional areas.

More specifically, the tape driving components in FIG. 1 comprise a tape media (101), which may be an optical tape, and the supporting servo drive system (100). The tape media (101) may be supplied on a supply reel (102) and can be transferred to a take-up reel (103) by servo action of a supply reel drive motor (104) and take-up reel drive motor (105). The two motors (104, 105) may act in unison to provide smooth movement of the tape (101) along the tape path.

As can be seen in FIG. 1, the tape media (101) has a width (w), as well as a length (l) stretching from respective ends of the tape (101), which ends are attached (not shown) to the supply and take-up reels (102, 103). The tape (101) travels in a direction shown by arrow (10) along a tape path. The tape path has a series of guide rollers (106), which help to provide control of the tape (101) as it is driven past a head assembly (200). A servo control system (not shown) may be used to provide closed loop motion control for the tape (101) and accurately control the tape tension and position with respect to the head assembly (200).

As also seen in FIG. 1, the head assembly (200) may be substantially disc-shaped, including a substantially circular and substantially planar working surface (210) proximate the tape media (101). The head assembly (200) may include multiple heads (300) for recording and/or reading data tape media (101). In that regard, the head assembly (200) rotates during operation in a direction shown by arrow (20).

Figure 2A:
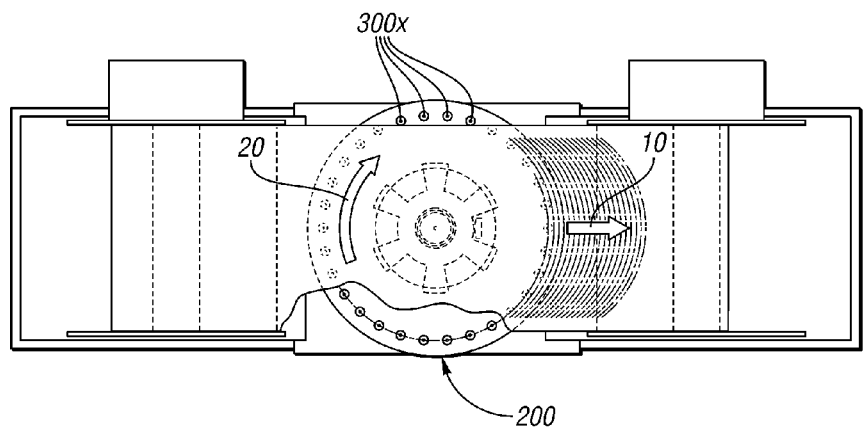
FIG. 2a is a top view of an embodiment of the data storage and retrieval system disclosed herein.
Figure 2B:
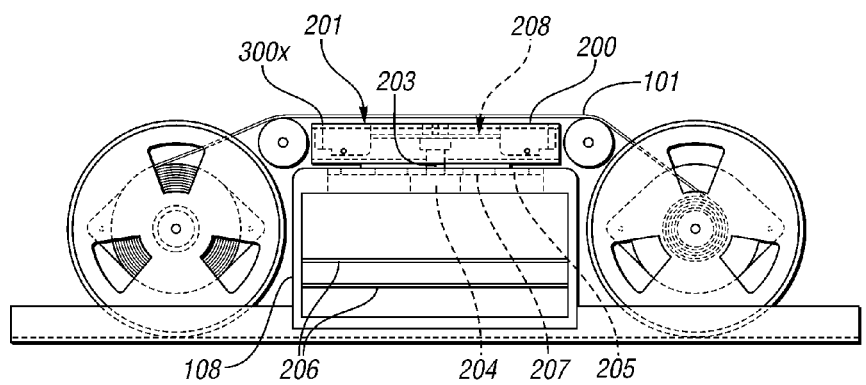
FIG. 2b is a side view of an embodiment of the data storage and retrieval system disclosed herein.

Referring next to FIGS. 2a and 2b, top and side views of an embodiment of the data storage and retrieval system disclosed herein are shown. In particular, the head assembly (200) is illustrated therein. The head assembly (200) may be built upon a head carriage unit (201). The carriage (201) may hold multiple Optical Pickup Unit (OPU) laser assemblies (300), which perform the actual writing/reading or recording/retrieval of data to/from an optical tape (101). While 30 OPU assemblies (300) are illustrated in FIG. 2a, any number of OPUs (300) may be used. As well, OPUs (300) may be similar assemblies as those used in Blu-Ray disc drives.

As seen in FIG. 2b, the OPU assemblies (300) may be located radially on the rotating head carriage (201) at a fixed radius in a substantially circular pattern. Such positioning of the OPU assemblies (300) can ensure that as the head assembly (200) rotates, the optical beams from each OPU (300) transcribe substantially equal radius arcs onto the tape media (101).

The rotatable head assembly (200) may be mounted underneath the tape media (101). A spindle shaft (203) may be provided for support of the rotatable head assembly (200). The head assembly (200) may be driven to rotate by a head drive motor (204). As shown in FIG. 2b, the head drive motor (204) may be built into the head assembly (200). In that regard, passive rotor magnets (205) associated with the rotating head assembly (200) may be driven by commutation of stator coils (not shown) fixed in the tape drive base (108).

Still Referring to FIG. 2b, a head assembly circuit board (208) may be provided to control the function of OPU assemblies (300), as well as data communication. Power may be supplied to the head circuitry (208) through an inductive coupling (207). Data signals to and from the OPU assemblies (300) may be sent through the inductive coupling (207). Motor control and further data signal processing may be performed by circuit boards (206), which may be located in the tape drive base (108).

Figure 3:
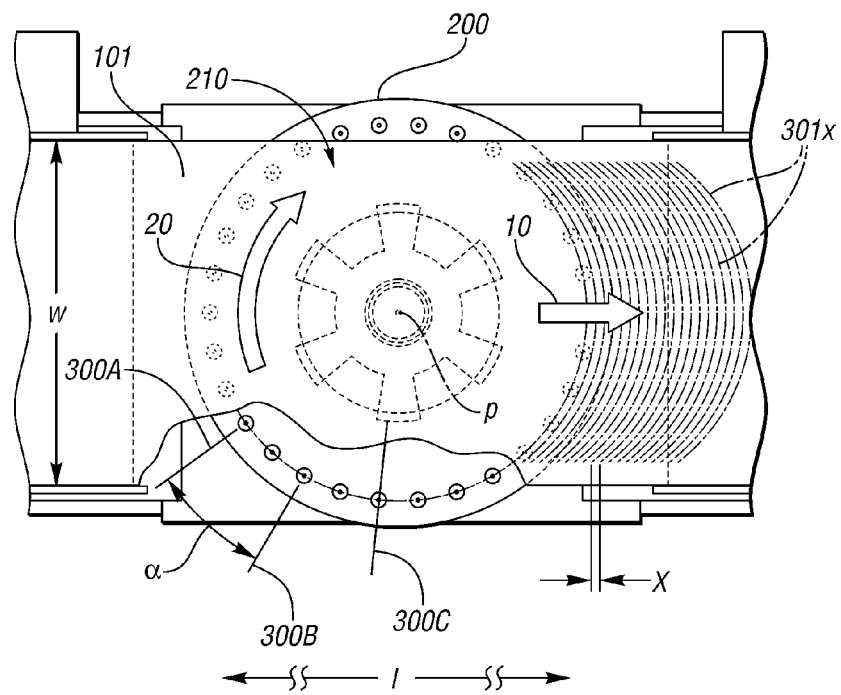
FIG. 3 is a top view of a tape media path in an embodiment of the data storage and retrieval system disclosed herein.

Referring next to FIG. 3, a top view of a tape media path is shown in an embodiment of the data storage and retrieval system disclosed herein. More particularly, the path of tape media (101) over the head assembly (200) is illustrated. The tape media (101) is depicted passing over the head assembly (200), from left to right, in the direction shown by arrow (10). The head assembly (200) also rotates in the clockwise direction, as illustrated by arrow (20).

The passage of optical beams from each OPU (300) (3 OPU assemblies (300) are shown in FIG. 3) past the tape media (101) may transcribe data tracks of recorded spots in substantially similar approximate arcs (301) on the tape media (101). The arcs (301) are only approximate in radius in that the movement of the tape media (101) past the heads (300) will skew the data tracks recorded from true arcs to elongated arcs (300) in proportion to the speed of the rotating heads (300) and the speed of the moving tape (101).

A servo control method and system (not shown) may also be provided to control the speed of the tape media (101) in such a way that the rotating laser spots from OPU assemblies (300) will individually write data tracks (301) with spacing set apart from one another as a function of the velocities of the tape media (101) and the rotating head assembly (200). More specifically, still referring to FIG. 3, angle α is the angle between two consecutive laser spots created by OPU assemblies (300A, 300B) on the head assembly (200). The distance X is the distance that the tape media (101) must translate in order to provide a separation of the data tracks (301) corresponding to consecutive OPU assemblies (300A, 300B). If the system is placed in motion at a constant velocity, then the displacement of the tape media (101) in relation to the head assembly (200) can be determined by knowing the velocity of the rotating head assembly (200), the angle α between consecutive OPUs (300A, 300B) on the head assembly (200), and the desired separation of the tracks.

In that regard, the relative speeds between tape media (101) and head assembly (200) that may be achieved by the data storage system and method disclosed herein are quite large, and can emulate the recording speed of a Blu-Ray DVD, while the speed of the tape media (101) can be quite slow. For example, a 4 inch diameter head assembly (200) with 30 OPU assemblies (300) rotating at 10,000 rpm may use a tape media speed less than 0.125 inches/sec. As a result, by moving both the tape media (101) and the recording heads (300), the data storage system and method disclosed herein having a rotating head assembly (200) may provide for very high data rates and very large storage capacity.

Referring still to FIG. 3, as previously described, head carriage unit (200) has a plurality of heads (300) disposed at the working surface (210). As also previously described, the head carriage unit (200) is adapted for rotational motion about an axis (p) oriented substantially normal to the working surface (210). As can also be seen, the tape media (101) has a width (w) approximately equal to a width of the working surface (210) of the head carriage unit (200) (which in the embodiment shown is the diameter of the substantially circular working surface (210)).

As can also be seen, the plurality of heads (300) move along the width (w) of the tape media (101) in a direction substantially perpendicular to the length (l) of the tape media (101) as the head carriage unit (200) rotates and the tape media (101) moves laterally past the working surface (210) of the head carriage unit (200) in a direction substantially parallel to the length (l) of the tape media (101). As previously described, each of the resultant plurality of data tracks (301) recorded on the tape media (101) has an arcuate shape.

Still referring to FIG. 3, as also previously described, the plurality of heads (300) disposed at the working surface (201) may be arrayed radially along the substantially circular working surface (201) substantially in a circle having a diameter less than the diameter of the working surface (201). As well, the tape media (101) may have a width (w) that is substantially equal to the diameter of the circle of the plurality of heads (300). Alternatively, the tape media (101) may have a width (w) that is less than the diameter of the circle of the plurality of heads (300), or that is greater than the diameter of the circle of the plurality of heads (300). In that regard, as an example only, the plurality of heads (300) may be located on the working surface (210) of the head carriage (200) substantially in a circle have a radius, r, and the tape media (101) may be provided with a width falling in the range of about 1.5 r to 2 r.

Figure 4:
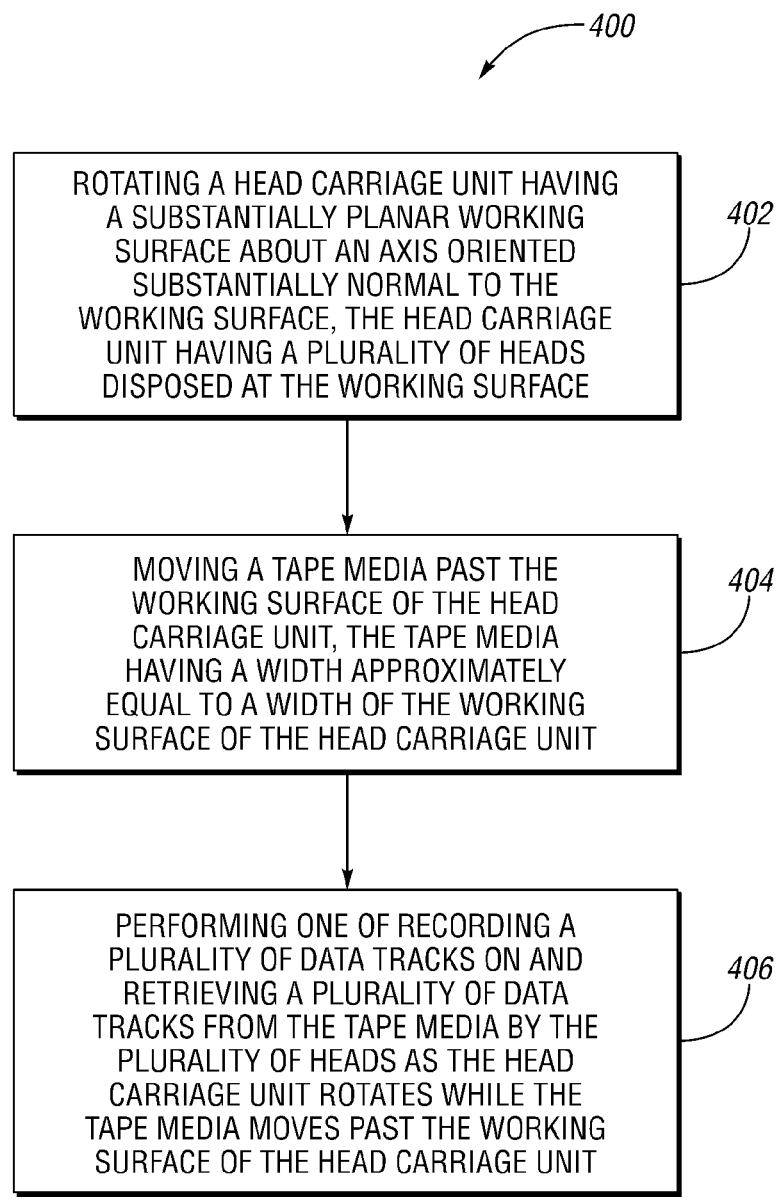
FIG. 4 is a simplified flowchart depicting an embodiment of the data storage and retrieval method disclosed herein.

Referring next to FIG. 4, simplified flowchart of an embodiment of the data storage and retrieval method (400) disclosed herein is shown. As seen therein, the method (400) comprises rotating (402) a head carriage unit having a substantially planar working surface about an axis oriented substantially normal to the working surface, the head carriage unit having a plurality of heads disposed at the working surface. The method further comprises moving (404) a tape media past the working surface of the head carriage unit, the tape media having a length and a width, the tape media width approximately equal to a width of the working surface of the head carriage unit. The method still further comprises performing (406) one of recording a plurality of data tracks on and retrieving a plurality of data tracks from the tape media by the plurality of heads as the head carriage unit rotates while the tape media moves past the working surface of the head carriage unit.

Once again, as described previously in connection with FIGS. 1-3, according to an embodiment of the data storage method disclosed herein, the plurality of heads may move along the width of the tape media in a direction substantially perpendicular to the length of the tape media as the head carriage unit rotates and the tape media moves laterally past the working surface of the head carriage unit in a direction substantially parallel to the length of the tape media. As a result, each of the plurality of data tracks recorded on the tape media may have an arcuate shape.

As also described above in connection with FIGS. 1-3, according to the data storage method disclosed herein, the head carriage unit may be substantially disc shaped, the working surface may be substantially circular, and the tape media width may be approximately equal to a diameter of the substantially circular working surface. As well, the tape media may be an optical tape, and the plurality of heads disposed at the working surface may comprise a plurality of optical heads. The plurality of heads may also be arrayed radially along the substantially circular working surface, and may be arrayed substantially in a circle having a diameter less than the diameter of the working surface. Still further, the tape media width may be substantially equal to the diameter of the circle of the plurality of heads, less than the diameter of the circle of the plurality of heads, or greater than the diameter of the circle of the plurality of heads.

Still referring to FIG. 4, according to an embodiment of the data storage method disclosed herein, and as previously described in connection with FIGS. 1-3, each of the plurality of heads may be arrayed in the circle at an equidistant angle, α, from immediately adjacent heads. The method may still further comprise controlling the rotational speed of the head carriage unit, the lateral speed of the tape media, and the angle, α, between each of the plurality of heads to achieve a desired distance between each of the plurality of data tracks recorded on the tape media. It should be noted that the operations of the method (400) described herein may be performed in the sequence described, or in any other sequence or combination as appropriate or desired.

As is apparent from the foregoing description, an improved tape media data storage and retrieval system and method having a rotary head design is provided. A wide tape media provides a much greater tape surface area for a head, and achieves both high data capacity and fast access times. In a disclosed embodiment, a head may be swept substantially perpendicularly across the tape width while the tape is moved longitudinally past the moving head. Multiple heads may be assembled to a rotating head mechanism to write and/or read multiple tracks oriented in arcs on the tape. The data storage system and method disclosed allow for a large tape surface in proximity to many high speed heads, resulting in improved performance in data rates and data capacity per inch of tape. The design facilitates shorter tapes for fast searches, or longer tapes for extremely large data banks.

While certain embodiments of a data storage and retrieval system and method utilizing a tape media and a rotary head have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed is:

1. A data storage and retrieval system comprising:
a head carriage unit having a working surface and a plurality of heads disposed at the working surface, the head carriage unit adapted for rotational motion; and
a tape drive unit for moving a tape media past the working surface of the head carriage unit, the tape media having a width approximately equal to the width of the working surface of the head carriage unit;
wherein the plurality of heads are configured to record a plurality of data tracks on or retrieve a plurality of data tracks from the tape media when the head carriage unit rotates while the tape media moves past the working surface of the head carriage unit.

2. The system of claim 1 wherein the plurality of heads are configured to move along the width of the tape media in a direction substantially perpendicular to a length of the tape media when the head carriage unit rotates and the tape media moves laterally past the working surface of the head carriage unit in a direction substantially parallel to the length of the tape media so that each of the plurality of data tracks recorded on the tape media has an arcuate shape.

3. The system of claim 1 wherein the head carriage unit is substantially disc shaped and the working surface is substantially circular.

4. The system of claim 3 wherein the tape media width is approximately equal to the diameter of the substantially circular working surface.

5. The system of claim 3 wherein the plurality of heads are optical heads and are arrayed radially along the substantially circular working surface.

6. The system of claim 5 wherein the plurality of optical heads are arrayed substantially in a circle having a diameter less than the diameter of the working surface.

7. The system of claim 6 wherein the tape media width is substantially equal to the diameter of the circle of the plurality of optical heads.

8. The system of claim 7 wherein the tape media width is less than the diameter of the circle of the plurality of optical heads.

9. The system of claim 6 wherein each of the plurality of optical heads is arrayed in the circle at an equidistant angle, α, from the immediately adjacent optical heads, and a desired distance between each of the plurality of recorded data tracks is achieved by control of the rotational speed of the head carriage unit, a lateral speed of the tape media, and the angle, α, between each of the plurality of optical heads.

10. The system of claim 1 wherein the tape storage media comprises an optical tape.

11. The system of claim 10 wherein the plurality of heads comprise a plurality of optical heads.

12. The system of claim 1 wherein the working surface is substantially planar and the head carriage unit is adapted for rotational motion about an axis oriented substantially normal to the working surface.

13. A data storage and retrieval method comprising:
    rotating a head carriage unit having a working surface about an axis, the head carriage unit having a plurality of heads disposed at the working surface;
    moving a tape media past the working surface of the head carriage unit, the tape media having a width approximately equal to the width of the working surface of the head carriage unit; and
    as the head carriage unit rotates while the tape media moves past the working surface of the head carriage unit, recording a plurality of data tracks on or retrieving a plurality of data tracks from the tape media by the plurality of heads disposed at the working surface of the head carriage unit.

14. The method of claim 13 wherein the plurality of heads move along the width of the tape media in a direction substantially perpendicular to a length of the tape media as the head carriage unit rotates and the tape media moves laterally past the working surface of the head carriage unit in a direction substantially parallel to the length of the tape media so that each of the plurality of data tracks recorded on the tape media has an arcuate shape.

15. The method of claim 13 wherein the head carriage unit is substantially disc shaped and the working surface is substantially circular.

16. The method of claim 15 wherein the tape media width is approximately equal to the diameter of the substantially circular working surface.

17. The method of claim 13 wherein the tape storage media comprises an optical tape.

18. The method of claim 17 wherein the plurality of heads comprise a plurality of optical heads.

19. The method of claim 18 wherein the plurality of heads are optical heads and are arrayed radially along the substantially circular working surface.

20. The method of claim 19 wherein the plurality of optical heads are arrayed substantially in a circle having a diameter less than the diameter of the working surface.

21. The method of claim 20 wherein the tape media width is substantially equal to the diameter of the circle of the plurality of optical heads.

22. The method of claim 20 wherein the tape media width is less than the diameter of the circle of the plurality of optical heads.

23. The method of claim 20 wherein each of the plurality of optical heads is arrayed in the circle at an equidistant angle, α, from the immediately adjacent optical heads, and a desired distance between each of the plurality of recorded data tracks is achieved by control of the rotational speed of the head carriage unit, a lateral speed of the tape media, and the angle, α, between each of the plurality of optical heads.

24. The method of claim 13 wherein the working surface is substantially planar and the head carriage unit is adapted for rotational motion about an axis oriented substantially normal to the working surface.

25. A data storage and retrieval system comprising:
    a head carriage unit having a working surface and a plurality of optical heads disposed at the working surface, the head carriage unit adapted for rotational motion about an axis; and
    a tape drive unit for moving an optical tape media past the working surface of the head carriage unit, the tape media having a width approximately equal to the width of the working surface of the head carriage unit;
    wherein the plurality of heads are configured to record a plurality of data tracks on or retrieve a plurality of data tracks from the tape media, and the plurality of heads are configured to move along the width of the tape media in a direction substantially perpendicular to a length of the tape media when the head carriage unit rotates and the tape media moves laterally past the working surface of the head carriage unit in a direction substantially parallel to the length of the tape media so that each of the plurality of data tracks recorded on the tape media has an arcuate shape.

* * * * *